J. J. FLOOD.
BINDING POST FOR STORAGE BATTERIES.
APPLICATION FILED APR. 3, 1920.
1,375,654. Patented Apr. 19, 1921.
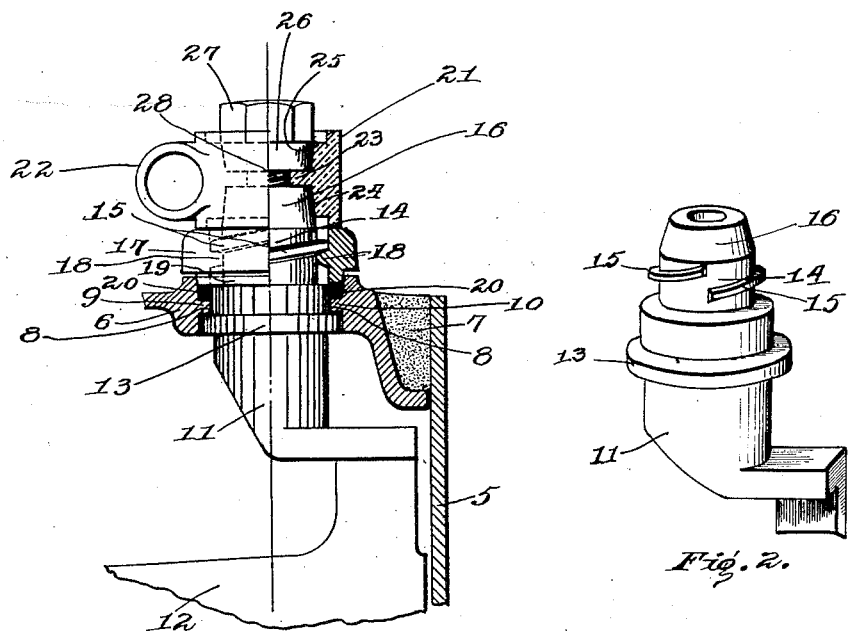
Fig. 1.
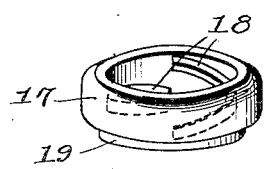
Fig. 2.
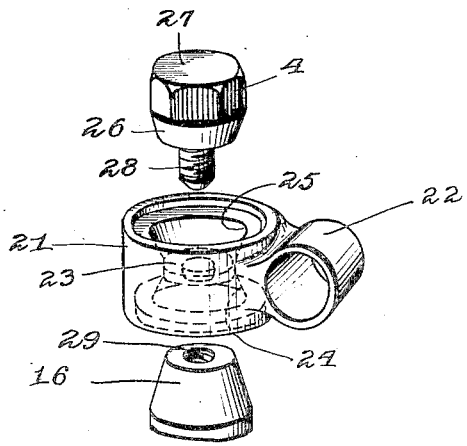
Fig. 3.
Fig. 4.
INVENTOR
Joseph J. Flood
BY
ATTORNEY

UNITED STATES PATENT OFFICE.

JOSEPH J. FLOOD, OF EAST ORANGE, NEW JERSEY.

BINDING-POST FOR STORAGE BATTERIES.

1,375,654.  Specification of Letters Patent.  Patented Apr. 19, 1921.

Application filed April 3, 1920. Serial No. 370,915.

*To all whom it may concern:*

Be it known that I, JOSEPH J. FLOOD, a citizen of the United States, residing at East Orange, in the county of Essex and State of New Jersey, have invented certain new and useful Improvements in Binding-Posts for Storage Batteries, of which the following is a specification.

My invention relates to improvements in storage batteries, and has particular reference to the connecting means between the cover and post of the battery.

An important object of the invention is to provide a connecting means between the cover and post, which will securely hold these parts together, and at the same time form a tight joint to prevent the leakage of the liquid from the battery.

A further object of the invention is to provide a joint of the above mentioned character, embodying a gasket which properly seals the joint, such gasket being so located that it is protected from the action of the liquid within the battery.

A further object of the invention is to provide a joint of the above mentioned character, embodying a thimble, which may be adjusted by turning, whereby its connecting lug may be arranged in any desired position, within a complete circle, such thimble also serving as means to prevent the accidental unscrewing of the nut carried by the post.

Other objects and advantages of the invention will be apparent during the course of the following description.

In the accompanying drawings, forming a part of this specification, and in which like numerals are employed to designate like parts throughout the same, Figure 1 is a central vertical longitudinal section through a device embodying my invention, Fig. 2 is a perspective view of the post, and, Fig. 3 is a similar view of the post nut.

Fig. 4 is a perspective view of the parts ready to be assembled.

In the drawings, wherein for the purpose of illustration is shown a preferred embodiment of my invention, the numeral 5 designates the shell or jar of a storage battery, which may be formed of hard rubber, or any other suitable material. The numeral 6 designates a cover for the shell 5, which cover may be formed of hard rubber or other suitable material. This cover fits within the shell, and forms a liquid tight joint therewith, by means of cement 7 or the like.

The cover 6 is provided with a suitable number of openings 8, which are vertical, and surrounded by a vertical annular flange 9, extending above and below the cover, as shown. Each flange 9 is provided interiorly thereof with a horizontal annular rib 10, preferably equi-distantly spaced from the upper and lower ends of the flange.

The opening 8 is adapted for the reception of a post 11 of the plate 12 of the battery. This post is arranged vertically and is preferably cylindrical, the same having an annular shoulder 13, to engage with and beneath the shoulder 10. The post 11 is provided with an upper reduced portion 14, which is circular in cross section, and provided with two helical threads 15, of one-half turn each. The reduced portion 14 is provided at its upper end with a tapered portion 16, as shown.

The numeral 17 designates a post nut, provided with two helical threads 18, of one-half turn each, for engagement with the threads 15. The post nut 17 is provided at its lower end with a reduced portion 19, to enter the flange 9, and engage a gasket 20 therein, supported by the rib 10, and thereby effect a gas tight joint. Particular attention is called to the fact that the gasket is protected by the ribs 10 and 13, from the contact with the liquid of the battery.

The numeral 21 designates a thimble, which is annular, and formed of suitable metal. This thimble may carry a lug 22, which may be cast thereon, and adapted for connection with any suitable terminal connecting device. The thimble is provided interiorly thereof with an annular rib 23, having a tapered recess 24 therebelow, for receiving the tapered portion 16, and a tapered recess 25 above this rib, for receiving a tapered extension 26 of a nut 27, the extension 26 being circular in cross section. The recesses 24 and 25 are of the same size which renders the thimble reversible. The nut 27 has a screw-threaded stud 28 rigidly secured thereto, such as by casting the nut about the end of the stud. This screw-threaded stud passes through the rib 23 and engages within a screw threaded opening 29 in the tapered portion 16.

With the elements arranged as shown in Fig. 1, the post 11 is securely locked to the cover 6, and the gasket 20 and associated elements, effect a gas tight joint. The thimble 21 may be rotated upon the reduced portion 6, and clamped thereto by manipulation of the nut 27, whereby the lug 22 may assume any desired radial position, within the area of a complete circle.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:

1. The combination with the cover of a storage battery having an opening and a rib within the opening, of a post to extend through the opening, said post having its upper portion screw-threaded, a rib carried by the post and engaging beneath the first named rib, a gasket arranged above and in contact with the first named rib, a post nut having interior screw-threads to engage with the first named screw-threads and engaging the gasket, and a thimble carried by the post and engaging the post nut to prevent improper turning thereof.

2. The combination with the cover of a storage battery having an opening and a rib within the opening, of a post to extend through the opening, said post having its upper portion screw-threaded, a rib carried by the post and engaging beneath the first named rib, a gasket arranged above and in contact with the first named rib, and a post nut having interior screw-threads to engage the first named screw-threads and engaging the gasket.

3. The combination with the cover of a storage battery having an opening, of a post to extend through said opening, said post having its upper portion screw-threaded, a gasket arranged within the opening and engaging the post, a post nut having interior screw-threads to engage the first named screw-threads and having a portion extending into said opening and engaging said gasket, a thimble rotatably mounted upon the post and carrying a lug, said thimble engaging said post nut, to prevent improper rotation thereof and means to clamp the thimble to the post.

4. The combination with the cover of a storage battery having an opening, of a post extending through the opening and having a rib to engage with said cover, a post nut having screw-threaded engagement with the upper portion of the post and engaging said cover, a thimble having a recess to receive the upper end of the post and carrying a lug, said thimble being adapted to turn upon the post and engaging the post nut to prevent improper rotation thereof, and an element having screw-threaded engagement with the post and engaging the thimble to clamp the same to said post.

5. The combination with the cover of a storage battery having an opening, of a post extending through the opening, means to clamp the post to the cover including a post nut having screw-threaded engagement therewith, a thimble pivotally mounted upon the free end of the post and carrying a radial lug, said thimble engaging the post nut to prevent improper rotation thereof, and adjustable means to lock the thimble to the post.

6. In combination, a storage battery cover having an opening and a rib within said opening, a post extending through the opening and having a flange below the opening in engagement with the rib and a screw threaded portion above the flange, a gasket in the cover opening, and above the rib, a nut in engagement with the threaded portion of the post and extending into the opening in the cover and engaging the gasket.

7. In combination, a storage battery cover having an opening, a post extending through the opening, and having two screw threads of different pitch, a nut on the lower portion of the upper part of the post and engaging one of the screw threads, threaded means engaging the other thread and locking the nut against movement.

8. In combination, a storage battery cover having an opening, a post extending through the opening and having two screw threads of different pitch, a nut on the lower portion of the upper part of the post and engaging one of the screw threads, a thimble, engaging the nut and surrounding the post, a threaded member engaging the other thread and locking the thimble and nut against movement.

In testimony whereof I affix my signature.

JOSEPH J. FLOOD.